US009513653B2

(12) United States Patent
Everson et al.

(10) Patent No.: US 9,513,653 B2
(45) Date of Patent: Dec. 6, 2016

(54) METHOD AND APPARATUS FOR CONTROL OF A SWITCHED CURRENT CIRCUIT

(71) Applicants: Steven Everson, Gilbert, AZ (US); David Putti, Novi, MI (US)

(72) Inventors: Steven Everson, Gilbert, AZ (US); David Putti, Novi, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/486,430

(22) Filed: Sep. 15, 2014

(65) Prior Publication Data

US 2016/0077542 A1    Mar. 17, 2016

(51) Int. Cl.
     *H02P 1/00*        (2006.01)
     *G05F 3/26*        (2006.01)
     *H02P 29/00*      (2016.01)

(52) U.S. Cl.
CPC ............... *G05F 3/267* (2013.01); *H02P 29/00* (2013.01)

(58) Field of Classification Search
CPC .................................................. H02P 21/0089
USPC .......................................... 318/504, 494, 34
See application file for complete search history.

(56) References Cited

U.S. PATENT DOCUMENTS

| 5,552,684 A * | 9/1996 | Wada ................. B62D 5/0493 180/404 |
| 5,912,813 A * | 6/1999 | Kerkman .......... H02M 7/53875 318/811 |
| 7,276,877 B2 * | 10/2007 | Qiu ........................ H02P 21/13 318/453 |
| 7,397,212 B2 * | 7/2008 | Turner .................... H02P 23/14 318/561 |
| 8,400,798 B2 * | 3/2013 | Bagarelli .............. H02M 3/157 363/132 |

OTHER PUBLICATIONS

ST datasheet entitled "Low RDSON SPI controlled H-Bridge", Dec. 2013, retrieved at http://www.st.com/web/en/resource/technical/document/datasheet/CD00268302.pdf, 38 pages. Retrieved on Nov. 4, 2015.

(Continued)

*Primary Examiner* — David S Luo

(57) ABSTRACT

An apparatus and corresponding method are provided to control a switched current circuit by switching the switched current circuit into an ON-state, waiting an amount of waiting an amount of time $t_B$ after the current within the switched current circuit increases above a current threshold, and switching the switched current circuit into an OFF-state after waiting the time $t_B$. Further, a duration of time $t_{A1}$ between switching the switched current circuit in the OFF-state and the point at which the current within the switched current circuit decreases below the current threshold is determined, and the method includes waiting a time $t_{A2}$ after the current within the switched current circuit decreased below the current threshold, the time $t_{A2}$ based at least in part on the time $t_{A1}$, after which the switched current circuit is switched into the ON-state.

19 Claims, 6 Drawing Sheets

(56) References Cited

OTHER PUBLICATIONS

Freescale Semiconductor datasheet entitled " 5.0 A Throttle Control-H-Bridge", Rev. 10.0, Aug. 2014, retrieved at http://www.freescale.com/files/analog/doc/data_sheet/MC33926.pdf, 26 pages. Retrieved on Nov. 4, 2015.

Freescale Semiconductor, Technical Data, "5.0 H-Bridge with Load Current Feedback", Document Number: MC33887, Rev, 16.0, Oct. 2012, RoHS, pp. 1-37.

Freescale Semiconductor, Advance Information, "Prograrnmabe H-Bridge Power IC", Document Number: MC33899, Rev, 2.0, Jun. 2007, RoHS, pp. 1-26.

* cited by examiner

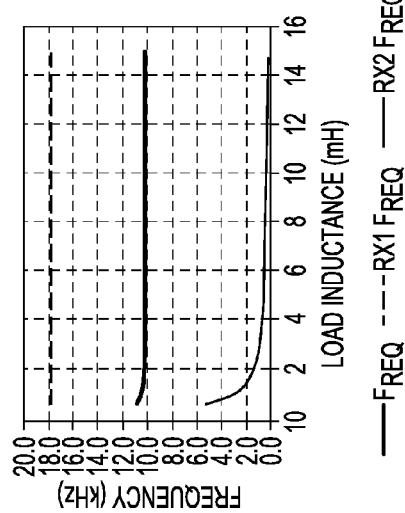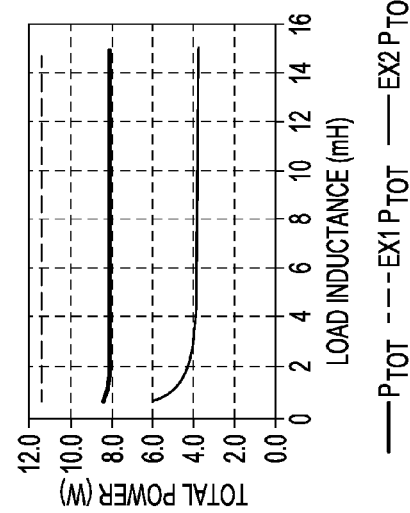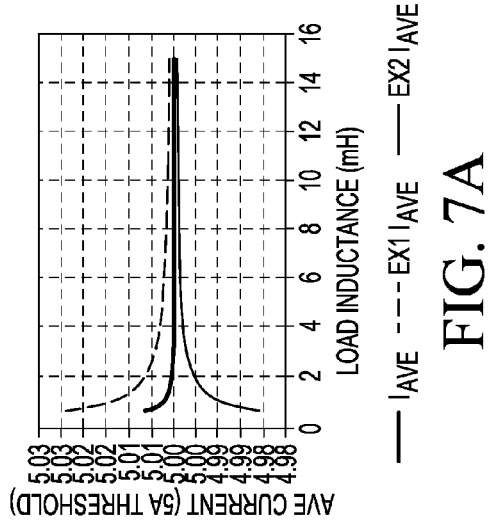
FIG. 7A  FIG. 7B  FIG. 7C
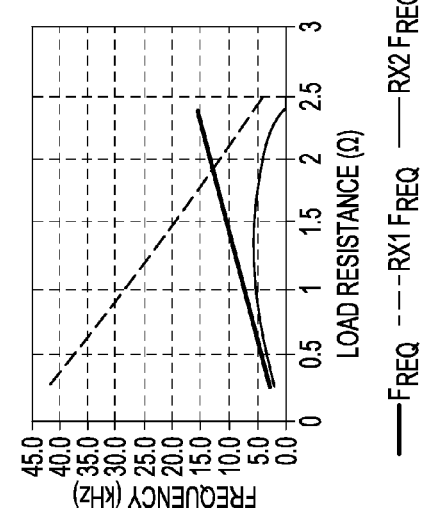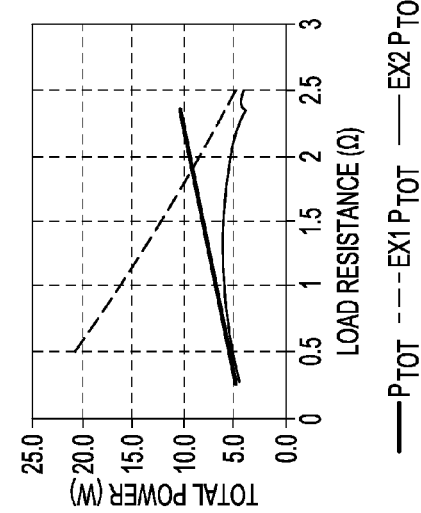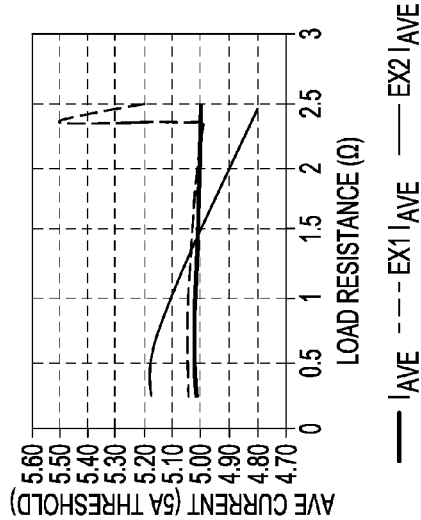
FIG. 8A  FIG. 8B  FIG. 8C

METHOD AND APPARATUS FOR CONTROL OF A SWITCHED CURRENT CIRCUIT

FIELD OF THE INVENTION

The present invention generally relates to control of switched current circuits, and more specifically to pulse-width modulating current regulators.

BACKGROUND OF THE INVENTION

Pulse-width modulating (PWM) current regulators are widely used in modern electronic applications. Particularly, PWM current regulators may be used to control current levels produced within a switched current circuit (for example, a switched power supply circuit, such as an H-bridge). Control of the current levels within the switched current circuit is often achieved by modulating the pulse-width and/or duty cycle of a signal controlling the application of a power source (e.g., voltage source or current source) applied to the switched current circuit. In many approaches, application of power to the switched current circuit is controlled by switching transistors that selectively apply power or cease application of power to the switched current circuit under the control of a PWM current regulator.

Different PWM current regulators presently exist, implementing a variety of differing current regulation techniques. Though suitable in some instances, such techniques may not meet the needs of all applications and settings. Many if not most of these techniques are based on a peak current control and thus do not provide for compensation for load or circuit conditions. This results in average currents that may not match a required or specified average current. Further, other techniques may result in peak currents or current thresholds that are too high, resulting in increased power dissipation and unnecessarily high operating temperatures.

BRIEF DESCRIPTION OF THE DRAWINGS

FIG. 7A is a signal diagram illustrating various output performance aspects of the current regulator of FIG. 1 in accordance with various embodiments of the present disclosure;

FIG. 7B is a signal diagram illustrating various output performance aspects of the current regulator of FIG. 1 in accordance with various embodiments of the present disclosure;

FIG. 7C is a signal diagram illustrating various output performance aspects of the current regulator of FIG. 1 in accordance with various embodiments of the present disclosure;

FIG. 8A is a signal diagram illustrating various output performance aspects of the current regulator of FIG. 1 in accordance with various embodiments of the present disclosure;

FIG. 8B is a signal diagram illustrating various output performance aspects of the current regulator of FIG. 1 in accordance with various embodiments of the present disclosure;

FIG. 8C is a signal diagram illustrating various output performance aspects of the current regulator of FIG. 1 in accordance with various embodiments of the present disclosure.

DETAILED DESCRIPTION

The present invention overcomes the aforementioned drawbacks by providing an apparatus (e.g., a pulse-width modulating current regulator) and corresponding method having a simple architecture that provides current at or near a required average current across a variety of load and circuit variations.

In one embodiment, an apparatus includes a current measurement module to measure a current within a switched current circuit, a timer, and a switch control module to control a switched current circuit. The apparatus also includes a processing device configured to configure the switched current circuit in an ON-state, wait a time $t_B$ after the current within the switched current circuit increases above a current threshold, and then configure the switched current circuit in the OFF-state after waiting the amount of time $t_B$. The processing device is also configured to determine a time $t_{A1}$ between configuring the switched current circuit in the OFF-state and the point at which the current decreases below the current threshold. The processing device is also configured to wait a time $t_{A2}$ after the current decreases below the current threshold and configure the switched current circuit in the ON-state after waiting the time $t_{A2}$, the time $t_{A2}$ being based on the time $t_{A1}$.

In another embodiment, a method of controlling a switched current circuit includes switching the switched current circuit into an ON-state, waiting an amount of time $t_B$ after the current increases above the current threshold, and switching the switched current circuit into an OFF-state after waiting the time $t_B$. The method also includes determining a duration of time $t_{A1}$ between switching the switched current circuit in the OFF-state and the point at which the current decreases below the current threshold, waiting a time $t_{A2}$ after the current decreased below the current threshold, and switching the switched current circuit in the ON-state after waiting the time $t_{A2}$, the time $t_{A2}$ being based on the time $t_{A1}$.

In another embodiment, a pulse-width modulating current regulator is configured to configure a switched current circuit in an ON-state, wait an amount of time $t_B$ after the current within the switched current circuit increases above a current threshold, and configure the switched current circuit in the OFF-state after waiting the amount of time $t_B$. The pulse-width modulating current regulator is also configured to determine a duration of time $t_{41}$ between configuring the switched current circuit in the OFF-state and the point at which the current decreases below the current threshold, wait a time $t_{42}$ after the current decreases below the current threshold, and configure the switched current circuit in the ON-state after waiting the time $t_{42}$, the time $t_{42}$ being based on the time $t_{41}$.

Figure 1:
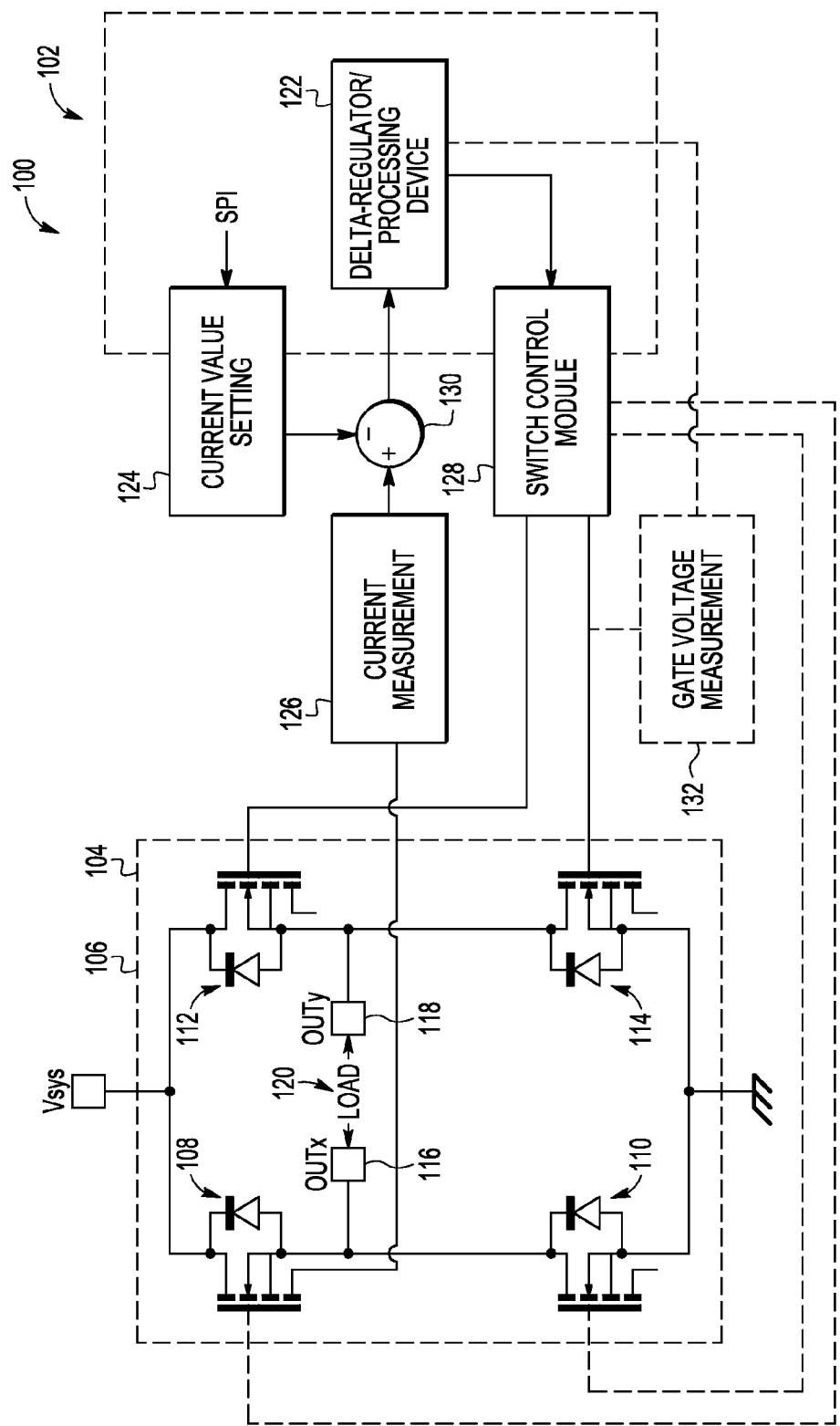
FIG. 1 is a diagram of a current regulator in accordance with various embodiments of the present disclosure.

Referring now to the figures, FIG. 1 shows a block diagram of an apparatus 100 in accordance with various embodiments. In one embodiment, the apparatus 100 is a pulse-width modulating (PWM) current regulator 102 configured to control a switched current circuit 104. The switched current circuit 104 may comprise a switched current power circuit for providing power to, for example, a motor. The switched current circuit 104 may comprise, in one embodiment, an H-bridge 106 having, for example, a plurality of transistors 108, 110, 112, 114 assembled in an H-bridge configuration, including a pair of outputs 116, 118 configured to drive a load 120. The transistors 108, 110, 112, 114 may include, for example, field-effect transistors (FET), junction gate FETs (JFET), complementary metal-oxide-semiconductors (CMOS), bipolar junction transistors (BJT), other transistor types, or a combination thereof. Other switched current circuit configurations are possible, as well.

The apparatus 100 may include a processing device 122. In certain embodiments, the apparatus 100 may also include a current value setting module 124, a current measurement module 126, and/or a switch control module 128. The current value setting module 124 may be electrically coupled to the processing device 122, or may be configured to receive a command from another source, for example, via a serial peripheral interface (SPI). The current measurement module 126 may be electrically coupled to one or more of the transistors 108, 110, 112, 114, or another component configured to measure or aid in the measurement of the current through the switched current circuit 104. The switch control module 128 may be electrically coupled to the processing device 122 and electrically coupled to one or more of the transistors 108, 110, 112, 114 to control their operation. In some embodiments, the apparatus 100 may further include a comparator 130 electrically coupled to the current value setting module 124, the current measurement module 126, and the processing device 122. In still other embodiments, the apparatus 100 may also include a gate voltage measurement module 132 electrically coupled to the processing device 122 and at least one gate of at least one transistor 108, 110, 112, 114.

In one embodiment, the current value setting module 124 operates, in part, in the analog domain in that it may be configured to output and/or generate an analog reference current corresponding to a current threshold (described below). The reference current may be linearly or non-linearly related to the actual desired current threshold. For example, if a desired current threshold of 10 amps is desired, the reference current may be 10 micro-amps (e.g., a 1/1,000,000 relationship), 100 micro-amps (e.g., a 1/100,000 relationship), 1 milliamp (e.g., a 1/10,000 relationship), or any other value corresponding to the current threshold. In some approaches, the current value setting module 124 is configured so that it is relatively accurate (e.g., 1% or less) and is relatively tolerant to required operating temperature ranges.

In another embodiment, the current measurement module 126 may be electrically coupled to a current mirror output of one or more of the transistors 108, 110, 112, 114, or another component configured to measure or aid in the measurement of the current through the switched current circuit 104 (e.g., a current sense resistor, a hall-effect sensor, or other known current measurement devices). The current measurement module 126 may output and/or generate an analog representative current corresponding to the measured current within the switched current circuit 104. In one embodiment, the current measurement module 126 implements a same or similar relationship or conversion between the actual current in the switched current circuit 104 and the output representative current as is implemented by the current value setting module 124.

The comparator 130 may have a first input to receive the reference current from the current value setting module 124 and a second input to receive the representative current from the current measurement module 126. The comparator may then output a signal indicative of a comparative state of the reference current and the representative current. For example, the comparator 130 may output a high-signal when the representative current is higher than the reference current and may output a low-signal when the representative current is lower than the reference current, though the opposite may be true in some application settings. The output signal may be coupled to the processing device 122 wherein the processing device 122 may use the output signal to determine or detect when the current within the switched current circuit 104 decreases above or below the current threshold.

In one approach, the processing device 122 is capable of receiving the representative current and/or converting it to a digital value, where a comparison to the current threshold value can be performed digitally therein. Alternatively, the current measurement module 126 is capable of outputting to the processing device a digital signal representative of the current within the switched current circuit 104 for further comparison.

The switch control module 128 receives one or more commands or signals from the processing device 122, or is integrated with the processing device 122, to effect control of one or more of the transistors 108, 110, 112, 114 of the switched current circuit 104. The switch control module 128 may include logic and/or amplifiers to generate output signals to drive the transistors 108, 110, 112, 114.

In an alternative embodiment, as is discussed in further detail below, the apparatus 100 may also include or be coupled to a gate voltage measurement module 132 configured to measure the voltage at a gate of one or more transistors 108, 110, 112, 114. The gate voltage measurement module 132 may exist as part of the processing device 122 or separate therefrom. The gate voltage measurement module 132 may compare the gate voltage to a reference voltage (e.g., a gate-off voltage or gate threshold voltage) to output a signal indicative of whether the voltage at the gate is above or below the gate threshold voltage. The output signal may then be sent to the processing device 122.

The processing device 122 may comprise one or more microprocessors, microcontrollers, Field-Programmable Gate Arrays (FPGA), Application-Specific Integrated Circuits (ASIC), Digital Signal Processors (DSP), Peripheral Interface Controllers (PIC) processors, or other known processing device types or combinations thereof. The processing device 122 may, in certain embodiments, include or be coupled to one or more memory devices as are known in the art. The processing device 122 may be coupled to a clock signal or clock signal generation component, or include an internal clock generation module. The processing device 122 may include various timers and/or counters that are coupled to the clock signal to count or maintain time. In certain embodiments, the processing device 122 has a simple architecture that may comprise a delta-regulator. The simpler architecture of the delta-regulator may include, for example, a collection of logic devices, register(s), timers, and/or counter(s) that implement a simple state machine configured to perform the method described herein in accordance with various embodiments. In such an approach, the apparatus 100 maintains a reduced complexity, which may improve manufacturability and reduce defects and/or cost.

In accordance with various embodiments, portions of the apparatus 100 may operate in a digital domain while other portions may operate in an analog domain. For example, processing of data or maintenance of a state machine may be performed digitally, while generation and comparison of the reference current and the representative current may be performed in analog. As such, the complexity of the overall apparatus 100 may be reduced, thus requiring a simpler state machine and simpler implementation in the digital domain.

In some embodiments, the apparatus 100 (e.g., the PWM current regulator 102) includes only the processing device 122, which may be coupled to the other components. In other embodiments, the apparatus 100 includes the current value setting module 124, the current measurement module 126, the switch control module 128, and the comparator. In other embodiments still, the apparatus 100 also includes the switched current circuit 104, while in even further embodiments, the apparatus includes the gate voltage measurement module 132. The various embodiments of the apparatus 100 described herein may be implemented in a single semiconductor die or package, or may be provided as a kit comprising a plurality of different and/or discrete components (e.g., a majority of the components within a first package with a separate package for the switched current circuit 104). Many variations are possible, as one of skill in the art will understand.

Figure 2:
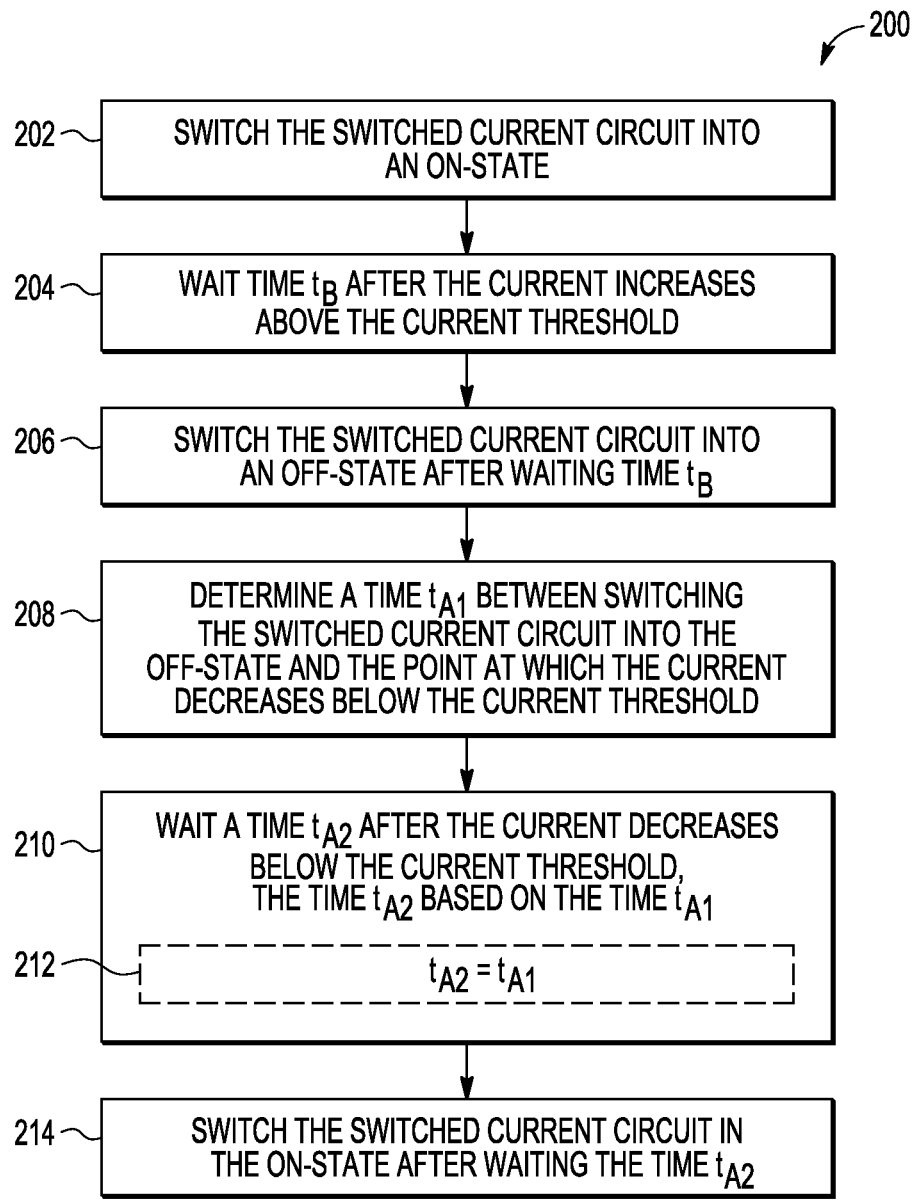
FIG. 2 is a flow diagram illustrating a method for use with the current regulator of FIG. 1 in accordance with various embodiments of the present disclosure.

Turning now to FIG. 2, a flow diagram illustrating a method 200 for use with the apparatus 100 is illustrated in accordance with various embodiments. Description of the method 200 is provided in conjunction with FIG. 3, which illustrates a signal diagram corresponding to the method 200 in accordance with various embodiments. At step 202, the method 200 includes switching the switched current circuit 104 into an ON-state wherein the current value increases within the switched current circuit 104. This is illustrated by the arrow 302 showing that circuit 104 is switched on at some point prior. For example, if the circuit 104 is being powered up from a zero current, the circuit 104 may be in the ON-state for a relatively longer time before the current exceeds the threshold $I_{THRESH}$. In one embodiment, the processing device 122 may communicate with or command the switch control module 128 to configure the switched current circuit 204 into the ON-state. As is shown in the example H-bridge 106 of FIG. 1, turning the switched current circuit 204 into the ON-state may entail turning transistor 108 on (if it is not permanently on), turning transistor 110 off (if it is not permanently off), turning transistor 112 off, and turning transistor 114 on. By this, current will flow from the voltage source through transistor 108, through the load 120, and through transistor 114 to ground.

Figure 3:
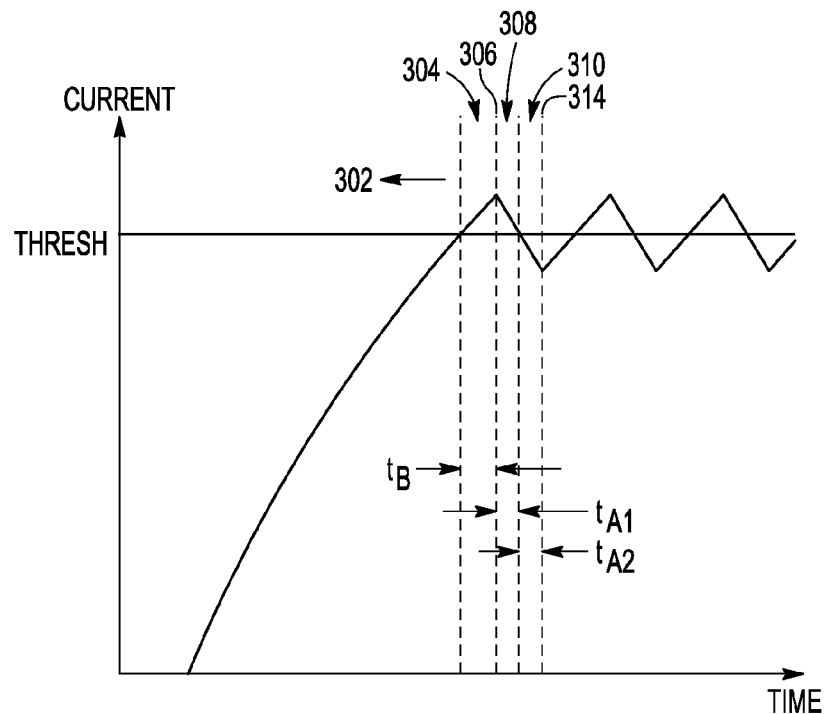
FIG. 3 is a signal diagram illustrating various aspects of the current regulator of FIG. 1 in accordance with various embodiments of the present disclosure.

Returning to FIG. 2, at step 204, the method 200 includes waiting an amount of time $t_B$ after the current within the switched current circuit 104 increases above a current threshold. As is shown in FIG. 3, time span 304 shows waiting the time $t_B$, during which the current will continue to increase. In one implementation, the processing device 122 may receive a signal from the comparator 130 indicating that the current within the switched current circuit 104 has exceeded the current threshold, wherein the processing device 122 may be configured to commence counting the time $t_B$ using a timer or counter. For example, the time $t_B$ may be stored into the timer or counter and then decremented down until zero.

Other PWM current regulators may utilize a set time for which to allow a current to increase. However, these other PWM current regulators begin counting the set time from the point when the current is activated within the circuit rather than at the point where the current level crosses the current threshold, as is discussed in accordance with various embodiments this present disclosure. Accordingly, the present apparatus can determine whether the current through the switched current circuit is above or below the current threshold while either increasing or decreasing the current. Other PWM current regulators can only make this determination while current is on the rise within the circuit (or only while decreasing). As such, in these other systems, the current regulator must turn the current back on to determine if the current level is above or below the threshold, which process actually increases the amount of time that it takes to reduce the current below the current threshold.

At step 206, the method 200 includes switching the switched current circuit 104 into an OFF-state after waiting the time $t_B$ wherein the current value decreases within the switched current circuit 104. This is illustrated at point 306 in FIG. 3, wherein the current stops increasing and begins decreasing. In one embodiment, the processing device 122 may communicate with or command the switch control module 128 to configure the switched current circuit 204 into the OFF-state. As is shown in the example H-bridge 106 of FIG. 1, turning the switched current circuit 204 into the OFF-state may entail turning transistor 112 on (while leaving transistor 108 on), and turning transistor 114 off (while leaving transistor 110 off). By this, current will begin to cease flowing as both sides of the load 120 are tied to the voltage source through transistor 108 and 112. Current may remain within the switched current circuit 104 due to inductance of the load 120 or other factors, but will begin to rapidly decrease. Other switching schemes are possible to control the switching current circuit 104. However, as described here, by leaving transistor 108 on throughout the ON/OFF cycle, current may continue to flow therethrough throughout the ON/OFF cycle. Accordingly, a current measurement may be retrieved via a current mirror on transistor 108, thus providing a single simple measurement of the current through the switched current circuit throughout the entire ON/OFF cycle. Other current measurement point(s) may be possible in various other positions within the switched current circuit 104 to achieve a similar result. However, according to various embodiments described herein, a measurement of the current within the switched current circuit 104 must be attainable throughout the entire ON/OFF cycle.

After the switched current circuit 104 is switched to the OFF-state, at step 208 the method 200 includes determining a duration of time $t_{A1}$ between switching the switched current circuit 104 in the OFF-state and the point in time at which the current within the switched current circuit 104 decreases below the current threshold. This duration of time $t_{A1}$ is illustrated at 308 in FIG. 3. In one embodiment, the processing device 122 counts using a timer or counter the time $t_{A1}$, for example, by incrementing a counter. Again, in one embodiment, the processing device 122 may receive a signal from the comparator 130 indicating that the current has dropped below the current threshold, at which point the counter may stop counting the time $t_{A1}$.

At step 210, the method 200 includes waiting a time $t_{A2}$ after the current within the switched current circuit 104 decreases below the current threshold. This is illustrated at 310 in FIG. 3 where the current continues to decrease below the current threshold $I_{THRESH}$ for the duration of time $t_{A2}$. The time $t_{A2}$ is based at least in part on the time $t_{A1}$. For example, and as is shown at step 212 in FIG. 2, time $t_{A2}$ may be equal to time $t_{A1}$. Accordingly, the method 200 may be such that waiting the time $t_{A2}$ comprises waiting a time equivalent to the time $t_{A1}$. In such an implementation where time $t_{A2}$ equals time $t_{A1}$, in one embodiment, the processing device 122 may begin decrementing the counter that has just counted up the time $t_{A1}$ in step 308. By this, once the counter reaches zero, the processing device 122 will have waited the time $t_{A2}=t_{A1}$. Of course, other timer implementations are possible.

Returning to FIG. 2, at step 214, after waiting the time $t_{A2}$, the method 200 includes switching the switched current circuit 104 in the ON-state. This is illustrated at point 314 in FIG. 3. At this point the cycle repeats itself in a manner that makes step 214 similar to or equivalent to step 202. As such, the processing device may configure the switched current circuit in the ON-state via the switch control module 128 and the process from steps 202-214 may repeat.

The embodiments described herein involve measuring a period of time of a decreasing current and subsequently waiting a time period related to the measured time period while the current continues to decrease. However, the teachings disclosed herein may be modified so that time measurement of $t_{A1}$ may be performed while the current is rising instead. It should be noted that, upon turning the switched current circuit 104 to the ON-state from a zero current or near-zero current, a value for $t_{A2}$ would need to be pre-established or otherwise stored for use on a first cycle as the current rises above the current threshold. Further, although the time $t_{A2}$ may be limited by the maximum length of the counter in some embodiments (e.g., by a counter implemented in the processing device 122 or delta-regulator), such a process may require at least one full cycle to establish an accurate measured time $t_{A1}$. In performing the method as described herein (e.g., measuring time $t_{A1}$ while current is falling), the apparatus 100 is reactive to actual performance characteristics immediately within the first cycle. Additionally, as mentioned above, as a current threshold or reference current is changed, the apparatus 100 can quickly adapt within one cycle. Further, in one embodiment, the size of the counter can be set and/or relied upon to establish a maximum amount of time $t_{A1}$, time $t_{A2}$, or time $t_B$ that can allow for changes in threshold current levels to have little impact on the operation of the apparatus 100 without the need for additional circuitry, programming, or control mechanisms.

In one embodiment, the apparatus 100 can be used as a current limiter at the threshold current (which is settable). This current limiter may be used in conjunction with a motor control or used as a motor control, possibly on the front end for front-end current limiting and/or control. Thus, in such an application setting, a motor control may be able to provide a maximum current level required to, for example, break a motor free from an iced state without overloading the motor or generating excessive heat so as to damage the motor and other circuitry or components.

Figure 4:
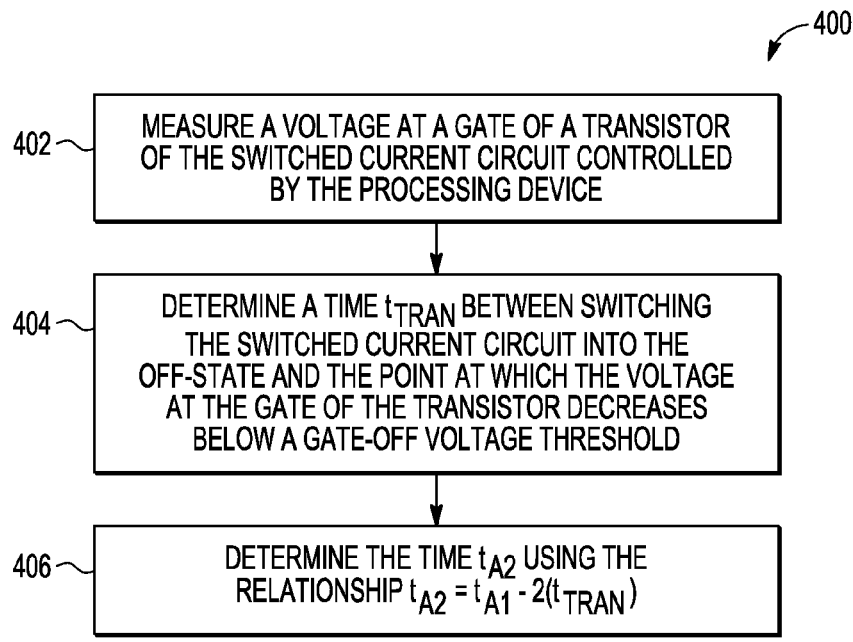
FIG. 4 is a flow diagram illustrating aspects of an alternative method for use with the current regulator of FIG. 1 in accordance with various embodiments of the present disclosure.

Turning now to FIG. 4, a flow diagram illustrating an alternative method 400 for use with the apparatus 100 is illustrated in accordance with various alternative embodiments. This alternative method 400 may be used in conjunction with the method 200 illustrated in FIG. 2, wherein the method 400 includes additional steps and/or details not originally included in the method 200 of FIG. 2. In one approach, the method 400 of FIG. 4 may be performed after step 206, as part of step 208, and/or as part of step 210 of the method 200 of FIG. 2.

At step 402, the method 400 includes measuring a voltage at a gate of at least one transistor (e.g., transistor 114, though other transistors are possible) of the switched current circuit 104. For example, this gate voltage measurement may be performed by the gate voltage measurement module 132, which may send an output signal to the processing device 122 indicative of either a value of the gate voltage or an indication that the gate voltage has decreased below a gate-off voltage threshold. Much like the comparator 130, the gate voltage measurement module 132 may output a high signal when the gate voltage is above the gate-off voltage threshold and output a low signal when the gate voltage is below the gate-off voltage threshold (though the opposite is also possible).

At step 404, the method 400 includes determining a duration of time $t_{TRAN}$ between switching the switched current circuit 104 in the OFF-state and the point at which the voltage at the gate of the at least one transistor decreases below a gate-off voltage threshold. With real-world transistors, transitions from ON to OFF and from OFF to ON involve a small transition delay due to parasitic capacitances and other factors. In one approach, the transition delay can be monitored by determining when the gate voltage passes the gate-off threshold. In one approach, the processing device 122 uses the signal (e.g., the transition in the signal) output from the gate voltage measurement module 132 to determine when the gate voltage drops below the gate-off voltage threshold, which corresponds to stopping the flow of current therethrough.

At step 406, the method 400 includes determining the time $t_{A2}$ by using the relationship $t_{A2}=t_{A1}-2(t_{TRAN})$. In one embodiment, the processing device 122 is configured to perform this mathematical relationship. Other details and benefits of this approach are discussed with reference to FIG. 5.

Figure 5:
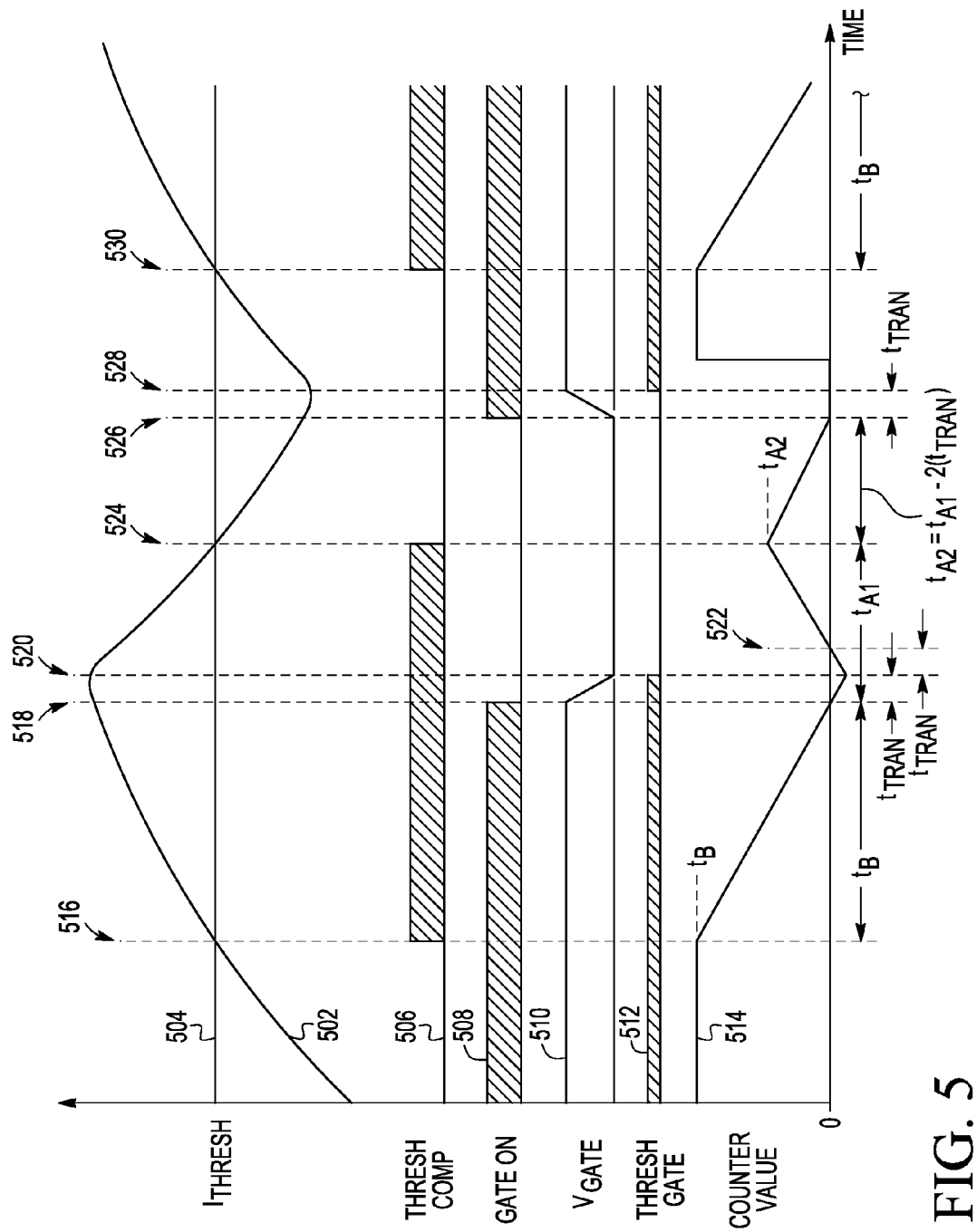
FIG. 5 is a signal diagram illustrating additional aspects of the current regulator of FIG. 1 in accordance with various embodiments of the present disclosure.

FIG. 5 illustrates a signal diagram corresponding to the method 400 (and to portions of the method 200) in accordance with various embodiments. The signal diagram in FIG. 5 represents a further detailed (and possibly exaggerated) version of the signal diagram in FIG. 3 and includes additional aspects related to the alternative method 400. The current 502 through the switched current circuit is shown along with the threshold current $I_{THRESH}$ 504. The threshold current 504 may correspond to an average desired current or a reference current. Below that is a signal "Thresh Comp" 506, which is the result of a comparison (e.g., by comparator 130) between the actual current 502 and the threshold current 504. The "Gate-On" signal 508 represents a control signal output by the processing device 122 to control the operation of the transistors, for example, by the switch control module 128. Below that is a representation of an example actual gate voltage "$V_{GATE}$" 510 showing the slew rates in the transition periods from ON to OFF and vice versa. The "Threshold Gate" signal 512 represents a comparison of the gate voltage and the gate-off voltages. The "Threshold Gate" signal 512 shows when the gate voltage of a transistor (e.g., transistor 114) is above a gate-off voltage, thus corresponding to current flow. This signal 512 may, in one embodiment, be produced by the gate voltage measurement module 132. As is shown here, the "Threshold Gate" signal 512 typically lags behind the "Gate On" signal 508 due to the gate switch transition time. Lastly, a counter value 514 is graphically illustrated representing a value of a counter within the processing device 122 or delta regulator 122 in at least one embodiment.

After the switching current circuit 104 is configured into the ON-state, the current 502 will begin to increase and will exceed the current threshold $T_{THRESH}$ 504 at point 516. As is shown, the "Thresh Comp" signal 506 transitions high, indicating that the current 502 is above the threshold 504. Prior to this point 516, the value $t_B$ will have been loaded into the counter as is shown in the counter value 514. At point 516 the counter begins to count downward. At point 518, the counter value 514 will reach zero and the "Gate On" signal 508 goes low to indicate a desire to switch the corresponding transistor off. Between point 518 and 520, the voltage in the gate of the transistor will begin to fall as it turns off, eventually passing the gate-off voltage threshold at point 520. Additionally, during the time between points 518 and 520, the current 502 will continue to flow through the switched current circuit 104 (though tapering) until approximately the point 520 when the gate-off voltage threshold is passed and the "Thresh Gate" signal 512 goes to low, as is illustrated at point 520. Additionally, during the time between points 518 and 520, the counter will continue to count down into the negative until point 520. The amount the counter goes negative corresponds to the time $t_{TRAN}$.

At point 520, the current 502 will begin to decrease as the transistor has completed its transition from ON to OFF, and the counter value 514 begins to count back upward again. At point 522, the timer will count back up to zero from its negative $t_{TRAN}$ count, and the time between 520 and 522 will also correspond to time $t_{TRAN}$. Then, at time 522, while the current 502 continues to decrease toward the current threshold 504, the counter value 514 will continue to count upward from zero. At point 524, the current 502 will drop below the current threshold 504, as is shown by the change in the "Thresh Comp" signal 506. Although the counter was technically counting $t_{A1}$ from the point 518, the counter will have only counted up to the time $t_{A2}=t_{A1}-2(t_{TRAN})$ due to the negative dip and subsequent positive travel back to zero taking a total time of $2(t_{TRAN})$. At point 524, the counter will start counting down from $t_{A2}$ until point 526 when the counter value 514 hits zero once again. At this point 524, the "Gate On" signal 508 is set high, the "$V_{GATE}$" 510 begins to transition upward until it passes the gate-on voltage threshold at point 528 when current 502 again begins to increase within the switched current circuit 104. At point 528 or some point thereafter, the time $t_B$ may be stored back into the counter value 514 to wait until point 530 when the current 502 crosses the current threshold 504 once again and the process repeats itself.

Although the time between points 526 and 528 is not technically counted, it is accounted for in the fact that the value $2(t_{TRAN})$ was removed off the front end of $t_{A1}$. This accounts for both the transition delay time for the transition from ON to OFF between points 518 and 520 and the transition from OFF to ON between points 526 and 528. By accounting for these transition delay times, a more accurate average current may be maintained. In one embodiment, the switched current circuit 104 is designed so that a transition delay times from ON to OFF are approximately the same as transition delay times from OFF to ON, which further increases the accuracy of maintaining an average current close to the current threshold value.

Figures 6A, 6B, 6C:
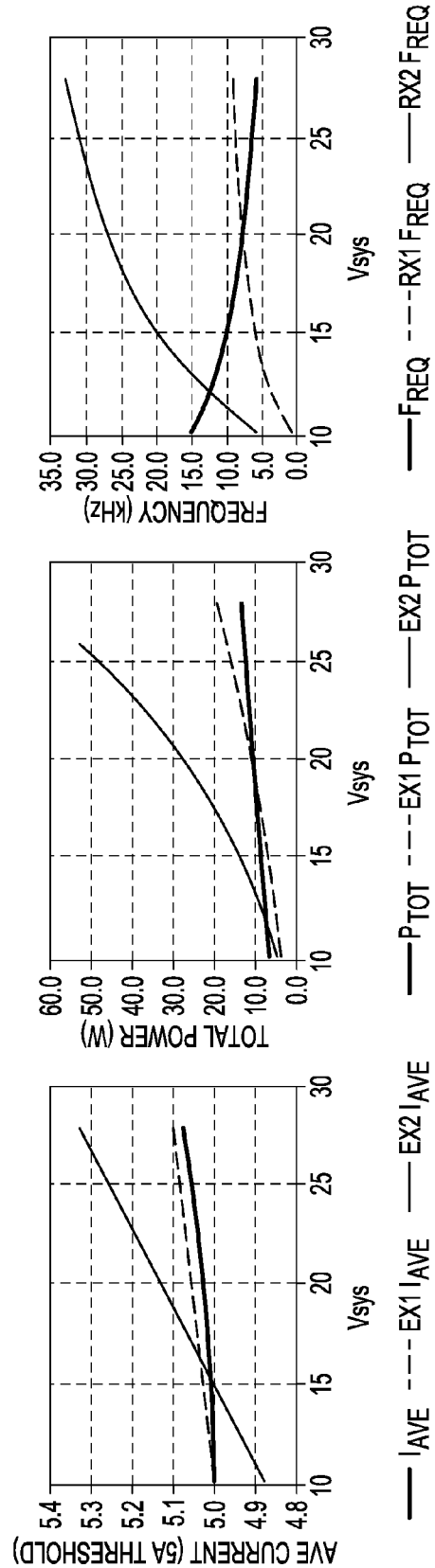
FIG. 6A is a signal diagram illustrating various output performance aspects of the current regulator of FIG. 1 in accordance with various embodiments of the present disclosure.
FIG. 6B is a signal diagram illustrating various output performance aspects of the current regulator of FIG. 1 in accordance with various embodiments of the present disclosure.
FIG. 6C is a signal diagram illustrating various output performance aspects of the current regulator of FIG. 1 in accordance with various embodiments of the present disclosure.

Turning now to FIGS. 6a-c, 7a-c, and 8a-c, output performance aspects of the apparatus 100 are illustrated in accordance with various embodiments. In each figure, a performance characteristic of the apparatus 100 is plotted in comparison to a first example and a second example. The first comparative example employs a current control utilizing current peak detection for both a turn-off and turn-on value. The second comparative example employs a current control by using a set delay time after passing the current threshold before turning the current on, and a set delay time after passing the current threshold before turning the current off. Each plot illustrates a simulated output where only the characteristic plotted on the horizontal axis is change. For example, FIGS. 6a-c show plots of average current, total power, and frequency (respectively) across a spectrum of system voltages. FIGS. 7a-c show plots of average current, total power, and frequency (respectively) across a spectrum of load inductances. FIGS. 8a-c show plots of average current, total power, and frequency (respectively) across a spectrum of load resistances. As can be seen, the output performance characteristics of the present apparatus 100 (e.g., the PWM current regulator 102) is much more stable across a variety of different operating and load conditions. Possibly most noteworthy, the apparatus 100 maintains stability of its average current better than the comparative examples across a wide variety of load conditions (as is shown in FIGS. 6a, 7a, and 8a).

Other aspects of the apparatus 100 may include an ability for the processing device 122 (or another device communicating with the processing device) to alter the time $t_B$. By altering the time $t_B$, the operating switching frequency of the apparatus 100 can be directly impacted. For example, if the time $t_B$ is increased, the switching frequency will decrease, while the opposite may also be true. Additionally, in some embodiments, the alteration of time $t_B$ may be in response to some other characteristic. For example, a method may include sensing a temperature of at least one component of the switched current circuit with a temperature sensor and subsequently altering the value of time $t_B$ based upon the sensed temperature. For example, if the temperature becomes too hot, the value of $t_B$ can be increased to slow down the frequency of the current switching and thereby reduce power dissipation within the switched current circuit 104.

So configured, an apparatus 100 comprising, in one embodiment, a PWM current regulator 102, can output an average current that is close to the current threshold ($I_{THREsH}$), reference current, or other desired current through and across a variety of operating conditions and load conditions. Current control can be achieved very quickly, within the first cycle in various embodiments, while a simple architecture can be utilized to minimize complexity and cost.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Various embodiments of the invention may be implemented at least in part in any conventional computer programming or firmware programming language. For example, some embodiments may be implemented in a procedural programming language (e.g., "C", and the like), or in an object oriented programming language (e.g., "C++" "JAVA", and the like). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system or a hardware platform. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

We claim:

1. An apparatus comprising:
    a current measurement module configured to measure a current within a switched current circuit;
    a timer;
    a switch control module configured to control a switch state of the switched current circuit, the switch state including at least an ON-state wherein the current value increases within the switched current circuit and an OFF-state wherein the current value decreases within the switched current circuit; and
    a processing device configured to:
        configure the switched current circuit in the ON-state via the switch control module;
        wait, using the timer, an amount of time $t_B$ after the current within the switched current circuit as measured by the current measurement module increases above a current threshold;
        configure the switched current circuit in the OFF-state via the switch control module after waiting the amount of time $t_B$;
        determine, using the timer, a duration of time $t_{A1}$ between configuring the switched current circuit in the OFF-state and a point at which the current within the switched current circuit decreases below the current threshold;
        wait, using the timer, a time $t_{A2}$ after the current within the switched current circuit decreases below the current threshold, the time $t_{A2}$ based at least in part on the time $t_{A1}$ and $t_{TRAN}$, wherein the time $t_{TRAN}$ corresponds to a duration of transition time that at least one transistor of the switched current circuit takes to transition from an ON-state to an OFF-state; and
        configure the switched current circuit in the ON-state via the switch control module after waiting the time $t_{A2}$.

2. The apparatus of claim 1 wherein the processing device is configured to wait the time $t_{A2}$ by waiting a time equivalent to the time $t_{A1}$.

3. The apparatus of claim 1 wherein the processing device is further configured to determine the time $t_{A2}$ using the relationship $t_{A2}=t_{A1}-2(t_{TRAN})$, the at least one transistor configurable by the processing device.

4. The apparatus of claim 3 further comprising a gate voltage measurement module configured to measure a voltage at a gate of the at least one transistor of the switched current circuit, wherein the processing device is further configured to:
  determine the duration of time $t_{TRAN}$ between configuring the switched current circuit in the OFF-state and the point at which the voltage at the gate of the at least one transistor measured by the gate voltage measurement module decreases below a gate-off voltage threshold.

5. The apparatus of claim 1 wherein the processing device is configured to alter the time $t_B$.

6. The apparatus of claim 1 wherein the apparatus at least one of comprises or is coupled to a motor control to control operation of a motor.

7. The apparatus of claim 1 further comprising:
  an analog current value setting module configured to output a reference current corresponding to the current threshold;
  the current measurement module being configured to output a representative current corresponding to the measured current within the switched current circuit; and
  a comparator including a first input configured to receive the reference current, a second input configured to receive the representative current, and an output configured to output a signal indicative of a comparative state of the reference current and the representative current, the output coupled to the processing device, wherein the comparator is configured to output a first signal when the representative current is less than the reference current and a second signal when the representative current is more than the reference current.

8. The apparatus of claim 1 wherein the switched current circuit comprises an H-bridge.

9. A method of controlling a switched current circuit comprising:
  switching the switched current circuit into an ON-state, wherein the current value increases within the switched current circuit;
  waiting an amount of time $t_B$ after the current within the switched current circuit increases above a current threshold;
  switching the switched current circuit into an OFF-state after waiting the time $t_B$, wherein the current value decreases within the switched current circuit in the OFF-state;
  determining a duration of time $t_{A1}$ between switching the switched current circuit in the OFF-state and a point at which the current within the switched current circuit decreases below the current threshold;
  waiting a time $t_{A2}$ after the current within the switched current circuit decreased below the current threshold, the time $t_{A2}$ based at least in part on the time $t_{A1}$ and $t_{TRAN}$, wherein the time $t_{TRAN}$ corresponds to a duration of transition time that at least one transistor of the switched current circuit takes to transition from an ON-state to an OFF-state; and
  switching the switched current circuit in the ON-state after waiting the time $t_{A2}$.

10. The method of claim 9 wherein waiting a time $t_{A2}$ comprises waiting a time equivalent to the time $t_{A1}$.

11. The method of claim 9 further comprising determining the time $t_{A2}$ using a relationship $t_{A2}=t_{A1}-2(t_{TRAN})$.

12. The method of claim 11 further comprising:
  measuring a voltage at a gate of the at least one transistor of the switched current circuit;
  determining the duration of time $t_{TRAN}$ between switching the switched current circuit in the OFF-state and the point at which the voltage at the gate of the at least one transistor decreases below a gate-off voltage threshold.

13. The method of claim 9 further comprising altering the value of time $t_B$.

14. The method of claim 13 further comprising:
  sensing a temperature of at least one component within the switched current circuit; and
  altering the value of time $t_B$ based at least in part on the sensed temperature.

15. The method of claim 9 further comprising:
  generating an analog reference current corresponding to the current threshold;
  generating an analog representative current corresponding to a measured current within the switched current circuit;
  comparing the reference current and the representative current;
  outputting a first signal when the representative current is less than the reference current and a second signal when the representative current is more than the reference current; and
  using the first signal and the second signal to detect when the current within the switched current circuit decreases below the current threshold or increases above the current threshold.

16. The method of claim 9 wherein switching the switched current circuit into the ON-state comprises switching an H-bridge circuit into an ON-state, and wherein switching the switched current circuit into the OFF-state comprises switching an H-bridge circuit into an OFF-state.

17. A pulse-width modulating current regulator configured to:
  configure a switched current circuit in an ON-state, wherein a current value increases within the switched current circuit;
  wait an amount of time $t_B$ after the current within the switched current circuit increases above a current threshold;
  configure the switched current circuit in an OFF-state after waiting the amount of time $t_B$, wherein the current value decreases within the switched current circuit in the OFF-state;
  determine a duration of time $t_{A1}$ between configuring the switched current circuit in the OFF-state and a point at which the current within the switched current circuit decreases below the current threshold;
  wait a time $t_{A2}$ after the current within the switched current circuit decreases below the current threshold, the time $t_{A2}$ based at least in part on the time $t_{A1}$ and $t_{TRAN}$, wherein the time $t_{TRAN}$ corresponds to a duration of transition time that at least one transistor of the switched current circuit takes to transition from an ON-state to an OFF-state; and
  configure the switched current circuit in the ON-state after waiting the time $t_{A2}$.

18. The pulse-width modulating current regulator of claim 17 further configured to wait the time $t_{A2}$ by waiting a time equivalent to the time $t_{A1}$.

19. The pulse-width modulating current regulator of claim 17 further comprising:
  a current value setting module configured to effect generation of an analog reference current corresponding to the current threshold;
  a switch control module configured to effect configuration of the switched current circuit in an ON-state and an OFF-state;

a delta-regulator configured to count time including the time $t_B$, the time $t_{A1}$, and the time $t_{A2}$, the delta-regulator also configured to receive an input signal indicative of a comparison between the reference current and a representative current corresponding to a measured current within the switched current circuit and to utilize various transitions in the input signal, at least in part, to count time.

\* \* \* \* \*